United States Patent
Maekawa et al.

(10) Patent No.: US 11,065,985 B2
(45) Date of Patent: Jul. 20, 2021

(54) VEHICLE SEAT DEVICE

(71) Applicants: TOYOTA BOSHOKU KABUSHIKI KAISHA, Aichi (JP); Mazda Motor Corporation, Hiroshima (JP)

(72) Inventors: Yasuhiko Maekawa, Aichi (JP); Shotaro Aratake, Aichi (JP); Ken Yoshioka, Hiroshima (JP)

(73) Assignees: TOYOTA BOSHOKU KABUSHIKI KAISHA, Aichi (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/732,902

(22) Filed: Jan. 2, 2020

(65) Prior Publication Data

US 2020/0215935 A1 Jul. 9, 2020

(30) Foreign Application Priority Data

Jan. 8, 2019 (JP) .............................. JP2019-001123

(51) Int. Cl.
*B60N 2/02* (2006.01)
*B60N 2/22* (2006.01)

(52) U.S. Cl.
CPC ......... *B60N 2/0232* (2013.01); *B60N 2/0244* (2013.01); *B60N 2/2227* (2013.01)

(58) Field of Classification Search
CPC ... B60N 2/0232; B60N 2/0244; B60N 2/2227
USPC .................................................. 297/362.11
See application file for complete search history.

(56) References Cited

U.S. PATENT DOCUMENTS

| 5,884,972 | A  | * | 3/1999 | Deptolla ................. | B60N 2/433 |
|           |    |   |        |                          | 297/378.11 |
| 8,016,358 | B2 | * | 9/2011 | Beneker .................. | B60N 2/20 |
|           |    |   |        |                          | 297/378.12 |
| 8,182,040 | B2 | * | 5/2012 | Muller .................... | B60N 2/22 |
|           |    |   |        |                          | 297/378.11 |
| 2003/0080600 | A1 | * | 5/2003 | Eppert ................. | B60N 2/2354 |
|           |    |   |        |                          | 297/367 R |
| 2005/0006920 | A1 |   | 1/2005 | Moriyama et al. | |
| 2007/0200408 | A1 |   | 8/2007 | Ohta et al. | |
| 2010/0141007 | A1 | * | 6/2010 | Kienke ................. | B60N 2/206 |
|           |    |   |        |                          | 297/367 R |

(Continued)

FOREIGN PATENT DOCUMENTS

| DE | 102009043140 | 3/2011 |
| EP | 1491388 | 12/2004 |

(Continued)

OTHER PUBLICATIONS

Extended European Search Report for EP20150444.6 dated May 15, 2020.

*Primary Examiner* — Mark R Wendell
(74) *Attorney, Agent, or Firm* — Greenblum & Bernstein, P.L.C.

(57) ABSTRACT

A vehicle seat device includes a seat main body having a seat cushion and a seatback, and a tilt device configured to exert a tilt function to tilt the seatback towards a seat front side. The tilt device includes an electric motor and a spring. The electric motor is configured to exert a rotational force to rotationally displace the seatback. The spring is configured to exert a resilient force to rotationally displace the seatback towards the seat front side.

10 Claims, 8 Drawing Sheets

(56) References Cited

U.S. PATENT DOCUMENTS

| | | |
|---|---|---|
| 2010/0244530 A1 | 9/2010 | Kitano et al. |
| 2012/0267932 A1 | 10/2012 | Narita et al. |
| 2012/0286556 A1* | 11/2012 | Couasnon .............. B60N 2/225 297/463.1 |
| 2013/0234489 A1* | 9/2013 | Lehmann ................ B60N 2/12 297/366 |
| 2017/0297457 A1 | 10/2017 | Murakami et al. |
| 2017/0334314 A1* | 11/2017 | Takada ................ B60N 2/1635 |
| 2018/0141471 A1 | 5/2018 | Fujishiro et al. |
| 2018/0154802 A1 | 6/2018 | Ito |

FOREIGN PATENT DOCUMENTS

| | | |
|---|---|---|
| EP | 2236348 | 10/2010 |
| EP | 2514631 | 10/2012 |
| JP | 2002065388 | 3/2002 |
| JP | 2018-083452 | 5/2018 |

* cited by examiner

VEHICLE SEAT DEVICE

CROSS-REFERENCE TO RELATED APPLICATIONS

This application claims the benefit of Japanese Patent Application No. 2019-001123 filed on Jan. 8, 2019 with the Japan Patent Office, the entire disclosure of which is incorporated herein by reference.

BACKGROUND

The present disclosure relates to a vehicle seat device configured to be mounted to a vehicle.

For example, in an invention disclosed in Japanese Unexamined Patent Application Publication No. 2018-083452 (Patent Document 1), a "folding down" function is achieved only by using a force of a spring. The "folding down" function is configured for providing functions such as those for improving accessibility to a space, for example, behind a door-side seat of the second-row of a three-seater minivan or behind a front passenger seat of a passenger car (e.g., "walk-in function").

SUMMARY

As the invention disclosed in Patent Document 1 achieves the "folding down" function only by using a force of a spring, a spring that can exert a large spring force is required to achieve a "folding down".

The present disclosure illustrates a vehicle seat device that requires less spring force.

A vehicle seat device configured to be mounted to a vehicle in one aspect of the present disclosure comprises a seat main body having a seat cushion and a seatback rotatable about a lower end of the seatback, and a tilt device having an electric motor and a spring, the electric motor being configured to exert a rotational force to rotationally displace the seatback, and the spring being configured to exert a resilient force to rotationally displace the seatback towards a seat front side. The tilt device is configured to provide a tilt function to tilt the seatback towards the seat front side by using the electric motor and the spring.

This configuration may enable the vehicle seat device to achieve the "folding down" by a hybrid method including the use of the electric motor and the spring. The spring force of the spring in the vehicle seat device can be less than that of the invention disclosed in Patent Document 1.

The vehicle seat device may be configured as below.

Desirably, when the tilt function is active, the tilt device rotationally displaces the seatback towards the seat front side to a given first position by driving the electric motor and then rotationally displaces the seatback to a tilt state by using the spring force. This enables a reduction of the spring force.

Desirably, the tilt device stops the electric motor when using the spring force while the tilt function is active. This enables the seatback to return to a previous position before the tilt when the seatback returns to a standing state from the tilt state.

Desirably, the tilt function is configured to be active when tilting the seatback towards the seat front side from a state where the seatback is tilted rearward beyond a given second position. This confidently enables a reduction of the spring force.

Desirably, the tilt device comprises a tilting member which is arranged on an approximately same axis as a rotation center axis of the seatback, configured to transmit the rotational force of the electric motor to the seatback, and rotatable relative to the seatback; an engagement member which is coupled to the seatback and displaceable between an engaged position for an engagement with the tilting member and a disengaged position where the engagement is released, and configured to enable transmission of the rotational force to the seatback when placed in the engaged position; a locking member configured to be displaceable between a locking position for retaining the engagement member in the engaged position and an unlocking position displaced from the locking position; an electric actuator configured to displace the locking member; and a controller configured to control operation of the electric motor and the electric actuator.

Desirably, the locking member is configured to be rotationally displaceable between the locking position and the unlocking position; the electric actuator is configured to rotationally displace the locking member via a manipulation cable.

Desirably, the spring force is transmittable to the seatback in response to an upward displacement of the engagement member relative to the tilting member.

Desirably, the vehicle seat device comprises a sliding device configured to slide the seat main body, and the sliding device is configured to slide the seat main body towards the seat front side in response to an end of the tilt function. This helps to achieve, for example, a "walk-in function".

Desirably, the aforementioned "given first position" is the foremost location of the seatback on the seat front side within a possible range of the rotational displacement of the seatback by the electric motor.

Desirably, the tilt device comprises a first reclining mechanism on a first end and a second reclining mechanism on a second end across a seat-width axis, the first and the second reclining mechanisms are located at a rotation center of the seatback, and a drive shaft arranged in the rotation center of the seatback, the drive shaft extending along the seat-width axis and configured to transmit a driving force to the first and the second reclining mechanisms; and desirably, the electric motor is configured to provide the rotational force to the drive shaft.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Embodiments explained hereinafter show examples of embodiments of the present disclosure. Matters to specify the invention recited in the claims are not limited to specific configurations or structures that are shown in the embodiments explained hereinafter.

The present embodiments are examples of a vehicle seat device in the present disclosure used for a seat installed in a vehicle. Arrows indicating directions in the drawings are made for easy understanding of relationship between the drawings.

Accordingly, the vehicle seat device should not be limited by the directions shown in the drawings. The directions in the drawings are defined in relation to the vehicle seat device according to the present embodiments that is assembled to a vehicle.

In respect of a member or portion explained hereinafter, there is at least one in number of such a member or portion unless the number is otherwise specified as "only one of". In other words, there may be two or more of such a member or portion when the number is not specified as "only one of".

First Embodiment

1. Outline of Vehicle Seat Device

Figure 1:
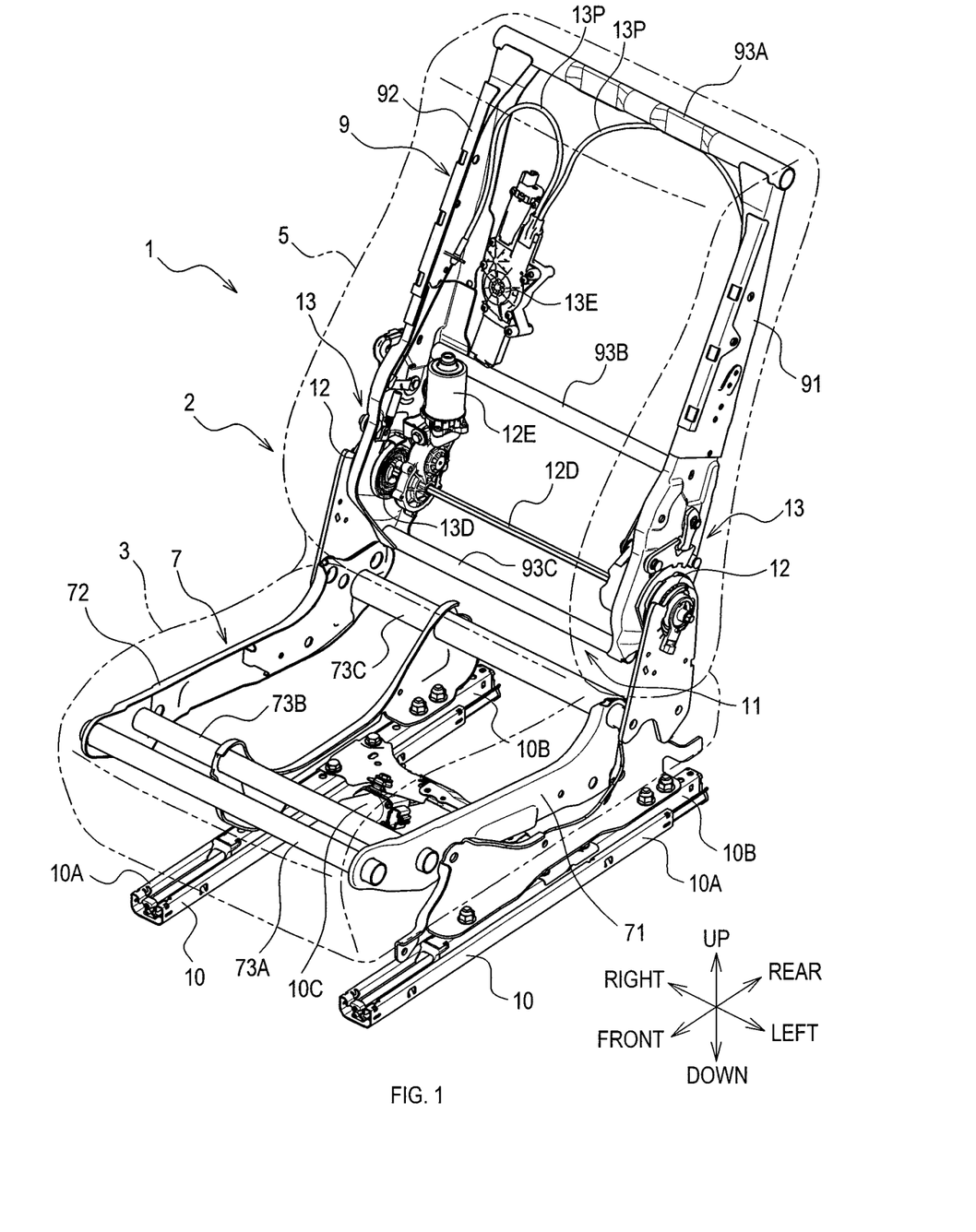
FIG. 1 is a diagram showing a vehicle seat device according to a first embodiment.

As shown in FIG. 1, a vehicle seat device 1 comprises at least a seat cushion 3 and a seatback 5. Seat main body 2 is a collective name of portions including the seat cushion 3 and the seatback 5.

The seat cushion 3 is a portion to support the buttocks of an occupant. The seatback 5 is a portion to support the back of the occupant. The seatback 5 is rotatable about its lower end.

A cushion frame 7 forms a framework of the seat cushion 3. The cushion frame 7 comprises at least two cushion side frames 71, 72 extending in front-rear directions of the seat and two or more coupling frames 73A to 73C (three coupling frames in the present embodiment).

The coupling frames 73A to 73C extend along a seat-width axis and couple the cushion side frame 71 with the cushion side frame 72. The cushion frame 7 is an approximately left-right symmetrical structure. The coupling frames 73A to 73C may be cylindrical rods.

A back frame 9 forms a framework of the seatback 5. The back frame 9 comprises at least two back side frames 91, 92 (a left back side frame 91 and a right back side frame 92) extending in approximately up-down directions when the seatback 5 is placed in a standing state (the state shown in FIG. 1) and two or more coupling frames 93A to 93C (three coupling frames in the present embodiment).

The coupling frames 93A to 93C extend along the seat-width axis and couple the left back side frame 91 with the right back side frame 92. The back frame 9 is an approximately left-right symmetrical structure.

The cushion frame 7, and therefore the seat main body 2, is supported by two sliding devices 10 so as to be slidable. The two sliding devices 10 are identical structures, each comprising at least a fixed rail 10A and a movable rail 10B, and optionally sharing a rail electric motor 10C.

Figure 2:
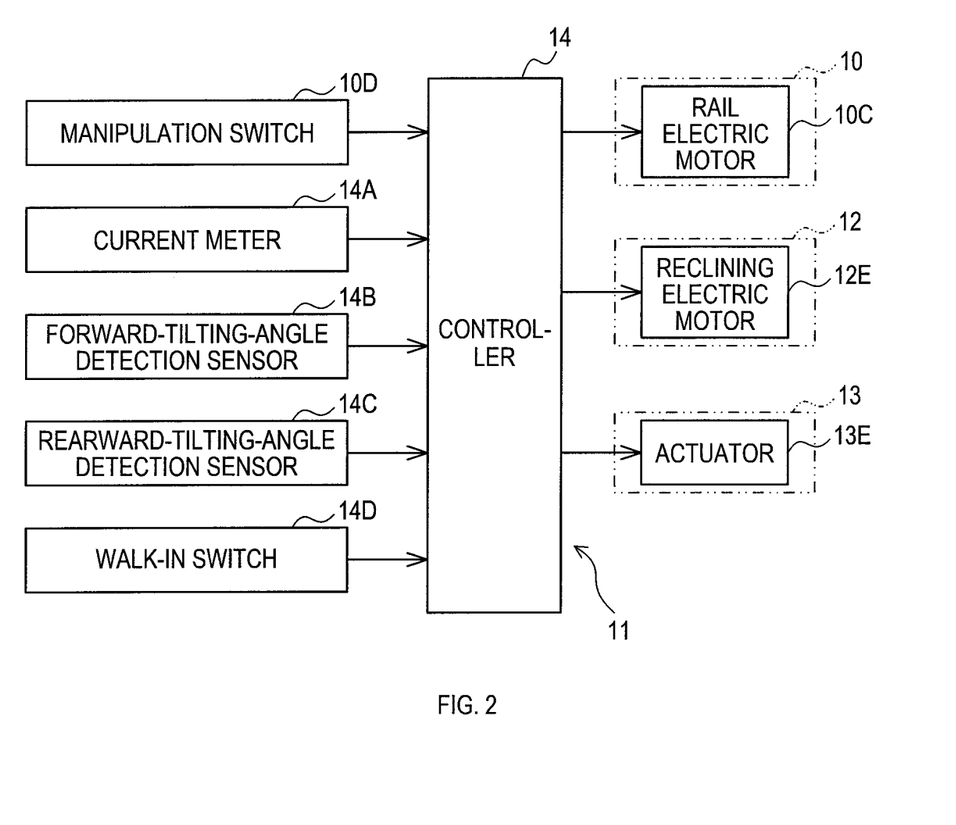
FIG. 2 is a block diagram showing the vehicle seat device according to the first embodiment.

Each fixed rail 10A is a rail member securely fixed directly or indirectly to the vehicle. The seat main body 2 is securely fixed to each movable rail 10B. Each movable rail 10B is slidable with respect to its corresponding fixed rail 10A The rail electric motor 10C exerts a driving force to slide each movable rail 10B. As shown in FIG. 2, an operation of the rail electric motor 10C is controlled by a manipulation switch 10D and a controller 14. The manipulation switch 10D is situated, for example, on a side surface of the seat cushion 3.

The controller 14 is situated in the seat main body 2 or in the vehicle (in the seat main body 2 in the present embodiment). In the present embodiment, a command signal from the manipulation switch 10D is inputted in the controller 14. In response to receiving the command signal, the controller 14 controls the operation of the rail electric motor 10C.

2. Tilt Device 2.1 Outline of Tilt Device

As shown in FIG. 2, a tilt device 11 comprises at least a reclining mechanism 12, a folding down mechanism 13, and the controller 14. The controller 14 can control operations of the reclining mechanism 12 and folding down mechanism 13 and the like.

The controller 14 comprises a microcomputer (not shown) comprising a CPU, an ROM, an RAM, and the like. A program to execute the control operation is pre-stored in a non-volatile storage device such as an ROM.

2.2 Structure of Recliner

FIG. 1 illustrates that the left reclining mechanism 12 and the right reclining mechanism 12 are situated respectively on the left side and the right side of the seatback 5 across the seat-width axis. The two reclining mechanisms 12 are identical structures except that they are left-right symmetric. Hereinafter, the left reclining mechanism 12 on the left side will be explained.

The left reclining mechanism 12 is installed in a lower end of an outer side of a left back side frame 91. The outer side of the left back side frame 91 is a side face of the left back side frame 91 facing opposite the right back side frame 92 along the seat-width axis.

Figure 3:
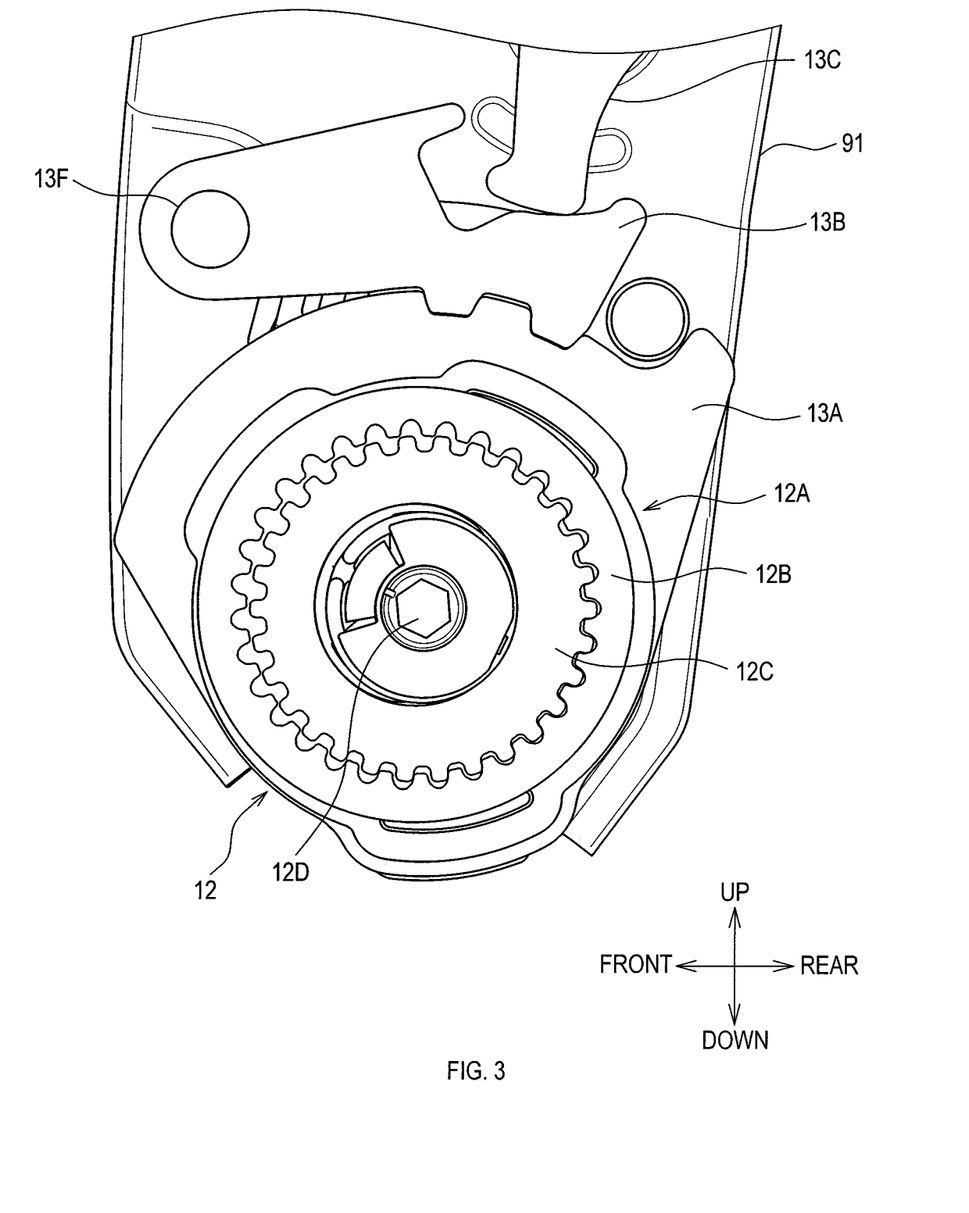
FIG. 3 is a diagram showing a reclining mechanism according to the first embodiment.

The left reclining mechanism 12 according to the present embodiment is functioned by an electrically operated angle position adjusting mechanism 12A. As shown in FIG. 3, the angle position adjusting mechanism 12A includes a taumel deceleration mechanism comprising at least an internally toothed gear 12B and an externally toothed gear 12C.

The internally toothed gear 12B is an annular gear with all of its tooth tops protruding towards its center. The internally toothed gear 12B is securely fixed, directly or indirectly, to the cushion side frame 71. In other words, the internally toothed gear 12B can rotate in an integral state with the cushion side frame 71.

The externally toothed gear 12C has all of its tooth tops protruding radially outwardly. The externally toothed gear 12C meshes with the internally toothed gear 12B and rotates as it circles inside the internally toothed gear 12B. In other words, the externally toothed gear 12C is a planetary gear rotating about its own center while revolving about the center of the internally toothed gear 12B.

The externally toothed gear 12C rotates in response to a supply of a rotational force from a reclining electric motor 12E (see FIG. 1) via a drive shaft 12D. As shown in FIG. 1, the drive shaft 12D extends along the seat-width axis and distributes the driving force to the reclining mechanisms 12 at a rotation center of the seatback 5.

If the number of teeth of the externally toothed gear 12C is $Z1$ and the number of teeth of the internally toothed gear 12B is $Z2$ ($>Z1$), then the externally toothed gear 12C revolves $(Z2-Z1)/Z2 \times n$ degrees when the externally toothed gear 12C rotates n degrees.

The center of rotation of the externally toothed gear 12C accordingly moves in a direction of revolution with respect to its original position by every rotation of the externally toothed gear 12C. More specifically, by every rotation of the externally toothed gear 12C, the center of rotation of the externally toothed gear 12C moves in the direction of revolution by $360-[(Z2-Z1)/Z2 \times 360]$.

The externally toothed gear 12C is securely and integrally fixed to a tilting member 13A (see FIG. 4) by a fixing structure such as a weld. Thus, as the reclining electric motor 12E (the drive shaft 12D) rotates, the externally toothed gear 12C moves in the direction of revolution and the tilting member 13A accordingly rotates in the direction of revolution.

That is, the force that moves the externally toothed gear 12C in the direction of revolution also serves as a force to rotate the seatback 5. In other words, the left reclining mechanism 12 decelerates the rotation of the reclining electric motor 12E and performs a function of transmitting the decelerated rotation to the tilting member 13A, and the externally toothed gear 12C performs as an output gear of the left reclining mechanism 12 which is included in the deceleration mechanism.

2.3 Folding Down Mechanism

Figure 4:
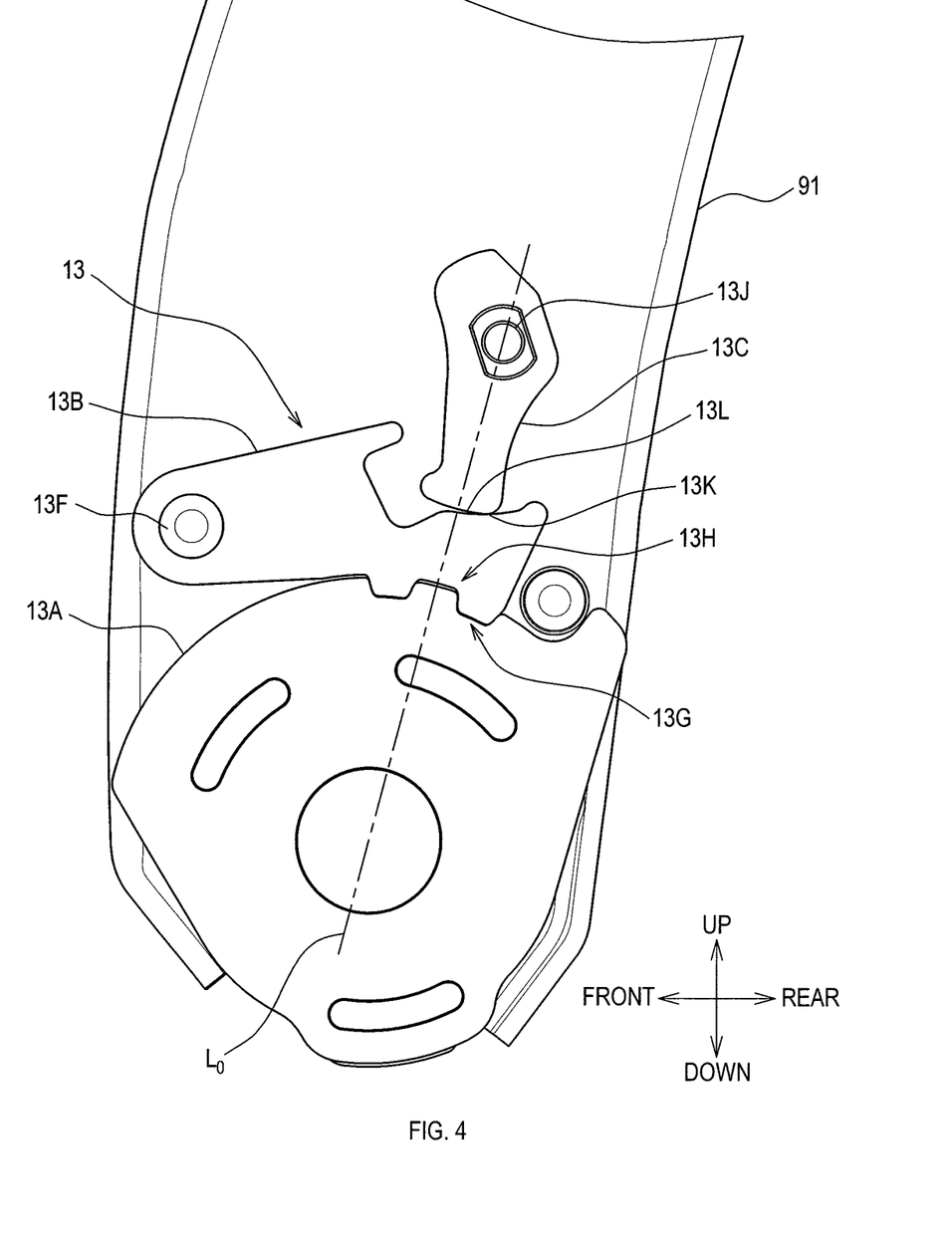
FIG. 4 is a diagram showing a folding down mechanism according to the first embodiment.

As shown in FIG. 4, the folding down mechanism 13 comprises at least the tilting member 13A, an engagement member 13B, an locking member 13C, a spring 13D (see FIG. 5), and an electric actuator 13E (see FIG. 1).

As shown in FIG. 4, the tilting member 13A is arranged on the approximately same axis as a rotation center axis of the seatback 5. The tilting member 13A is a member configured to transmit a force to rotate (recline) the back frame 9 to the left back side frame 91.

In other words, the tilting member 13A is configured to transmit the rotational force of the reclining electric motor 12E, which is the output force of the reclining mechanism 12, to the seatback 5 (the left back side frame 91). The tilting member 13A is also called a ratchet plate or a rotation cam.

The tilting member 13A is coupled to the left back side frame 91 so as to be rotatable with respect to the left back side frame 91. In other words, the tilting member 13A and the left back side frame 91 (the back frame 9) are independently rotatable with respect to the cushion side frame 71 (and with respect to each other).

The engagement member 13B is coupled to the back frame 9 (the left back side frame 91 in the present embodiment) in a displaceable manner. The engagement member 13B is also displaceable between an engaged position (see FIG. 3 and FIG. 4) where the engagement member 13B is engaged with the tilting member 13A and a disengaged position (see FIG. 6) where the engagement is released. The engagement member 13B is also called a pawl.

As shown in FIG. 4, the engagement member 13B extends in the front-rear directions of the seat along a plate surface of the left back side frame 91 above the tilting member 13A. A seat front side portion of the engagement member 13B is rotatably coupled to the left back side frame 91 by a coupling pin 13F.

An engagement portion 13H is situated in a seat rear side portion of the engagement member 13B. The engagement portion 13H is configured to engage with an engagement target portion 13G situated in the tilting member 13A. The engagement target portion 13G and the engagement portion 13H both include a concavo-convex shape and are fitted to mesh with each other for engagement.

During the engagement of the engagement target portion 13G and the engagement portion 13H, the rotational force of the reclining electric motor 12E transmitted to the tilting member 13A, which is the output force of the reclining mechanism 12, is transmittable to the left back side frame 91.

Accordingly, if the externally toothed gear 12C revolves when the engagement member 13B is placed in the engaged position, the tilting member 13A and the back frame 9 rotate as one integrated member with respect to the cushion side frame 71.

When the engagement target portion 13G and the engagement portion 13H are not engaged, the output force of the reclining mechanism 12 is not transmittable to the left back side frame 91; accordingly, the left back side frame 91 is rotatable with respect to the tilting member 13A.

Figure 6:
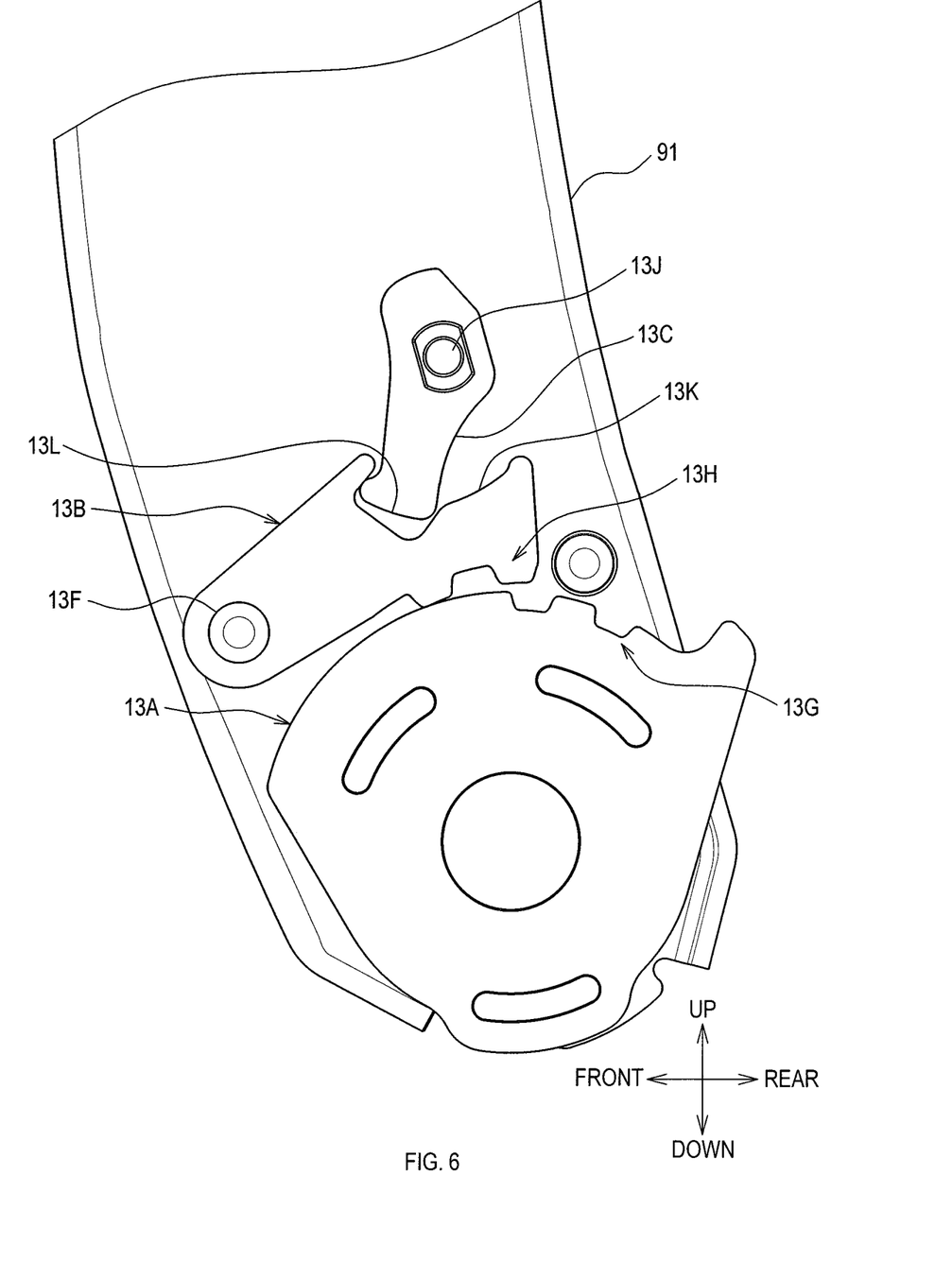
FIG. 6 is a diagram showing the folding down mechanism according to the first embodiment.

Thus, when the engagement member 13B is placed in the disengaged position, that is when the engagement member 13B is displaced upwards with respect to the tilting member 13A, a force of the spring 13D is transmittable to the seatback 5; accordingly, the left back side frame 91 can be tilted (folded down) towards the seat front side by the force of the spring 13D.

The locking member 13C is displaceable between a locking position for retaining the engagement member 13B in the engaged position and a position displaced from the locking position (hereinafter referred to as unlocking position). The locking member 13C according to the present embodiment is situated above the engagement portion 13H and extends in approximately up-down directions along the plate surface of the left back side frame 91.

An upper portion of the locking member 13C is rotatably coupled to the left back side frame 91 via a coupling pin 13J. A cam 13L configured to slide contact a sliding-contact portion 13K of the engagement member 13B is situated in a lower end of the locking member 13C.

When the locking member 13C is placed in the locking position, a longitudinal axis of the locking member 13C is substantially parallel to an imaginary line Lo. The imaginary line Lo passes the pivot center of the locking member 13C and the pivot center of the tilting member 13A.

Figure 5:
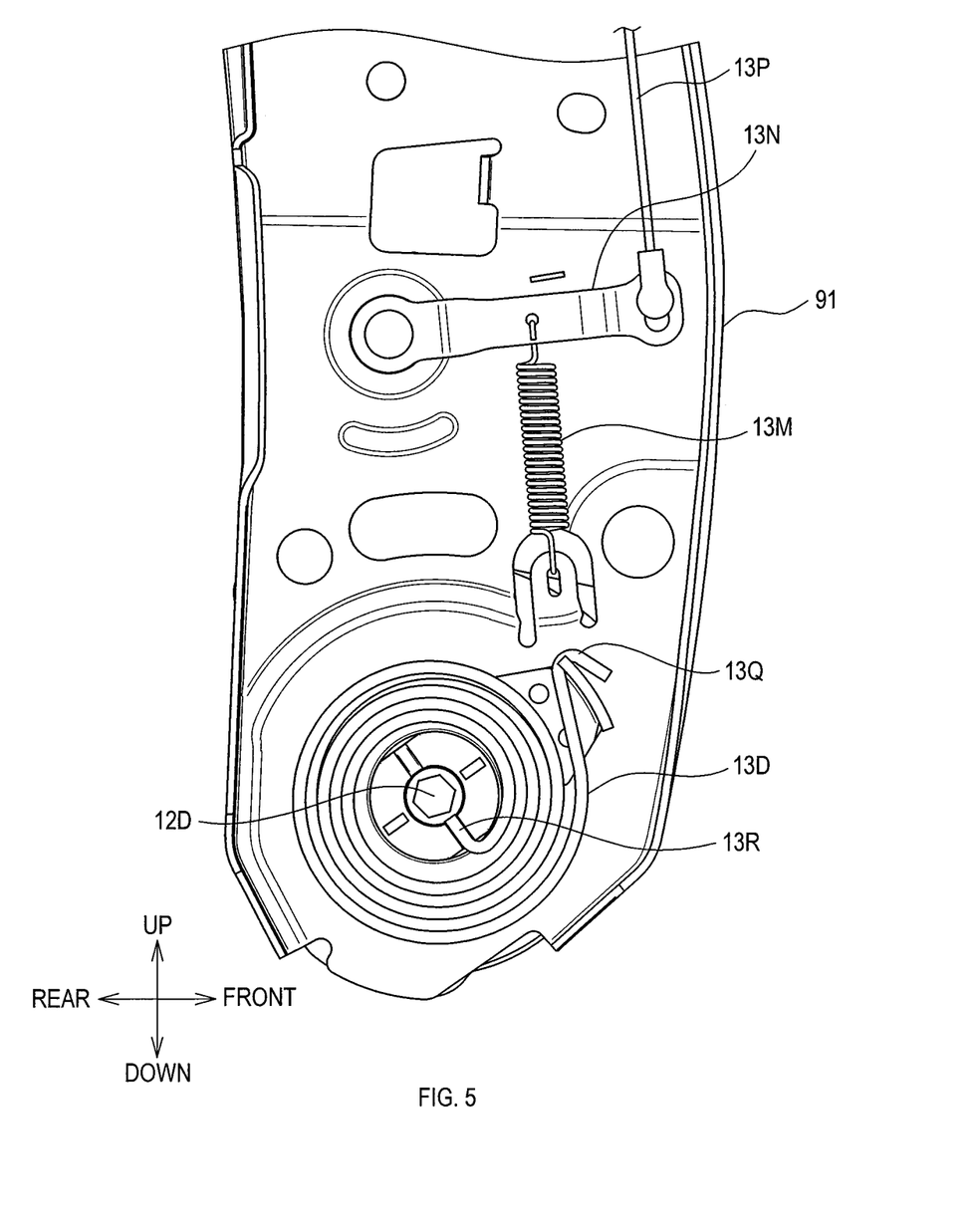
FIG. 5 is a diagram showing the folding down mechanism according to the first embodiment.

FIG. 5 shows that a recovery spring 13M and an arm 13N are situated on the opposite side of the locking member 13C across the left back side frame 91, in other words, on a portion of the left back side frame 91 facing the right back side frame 92.

The recovery spring 13M exerts a resilient force to retain the locking member 13C in the locking position via the arm 13N. One end of a manipulation cable 13P is coupled to a leading end of the arm 13N.

Returning to FIG. 1, the other end of the manipulation cable 13P is coupled to the actuator 13E. Thus, when the manipulation cable 13P is pulled by the actuator 13E, the locking member 13C is unlocked (displaced towards the unlocked position).

A spring (not shown) configured for retaining the engagement member 13B in the disengaged position is situated in the left back side frame 91. Thus, as the locking member 13C is displaced to the unlocking position, the engagement member 13B is accordingly displaced towards the disengaged position by the resilient force of the spring. Then, when the locking member 13C returns from the unlocking position to the locking position, the locking member 13C displaces (returns) the engagement member 13B from the disengaged position to the engaged position.

Returning to FIG. 5, the spring 13D is situated in a portion of the left back side frame 91 facing the right back side frame 92. The spring 13D exerts the resilient force to rotationally displace the back frame 9 towards the seat front side.

The spring 13D according to the present embodiment is a spiral spring. An outer peripheral end 13Q of the spring 13D is securely fixed to the left back side frame 91 by locking. A central end 13R of the spring 13D is securely fixed to the externally toothed gear 12C by locking. The spring 13D is therefore enabled to apply, on the back frame 9, the resilient force enough to tilt the left back side frame 91 towards the seat front side.

The tilting member 13A and the left back side frame 91 are integrated (engaged together) when the engagement member 13B is placed in the engaged position. In other words, the left back side frame 91 is immovable with respect to the tilting member 13A when the engagement member 13B is placed in the engaged position.

The tilting member 13A is rotatable with respect to the left back side frame 91 when the engagement member 13B is placed in the disengaged position. In other words, the left back side frame 91 is rotatable with respect to the tilting member 13A by the resilient force of the spring 13D when the engagement member 13B is placed in the disengaged position (releasing the tilting member 13A from the left back side frame 91).

2.4 Operation of Tilt Device

The tilt device 11 can perform a tilt function for tilting the seatback 5 towards the seat front side by using the reclining electric motor 12E and the spring 13D. In other words, as shown in FIG. 2, the controller 14 can control operations of the reclining electric motor 12E of the reclining mechanism 12 and the actuator 13E of the folding down mechanism 13.

When the tilt function is performed, the tilt device 11, and therefore the controller 14, rotationally displaces the seatback 5 towards the seat front side to a preset position (hereinafter referred to as foremost position Pf) by operating the reclining electric motor 12E, and then rotationally displaces the seatback 5 to the tilt state by using the force of the spring 13D.

The foremost position Pf according to the present embodiment (the position of the seat drawn in solid line in FIG. 7) is the foremost location of the seatback 5 on the seat front side within a possible range of the rotational displacement of the seatback 5 by the reclining electric motor 12E. In other words, the reclining mechanism 12 cannot cause a forward tilting rotation of the seatback 5 towards the seat front side beyond the foremost position Pf.

In the present embodiment, the seatback 5 (specifically the left and right back side frames 91 and 92) comes in contact with a limiter (not shown), such as a stopper, when the seatback 5 reaches the foremost position Pf. Thus, the forward tilting rotation of the seatback 5 is mechanically stopped in the present embodiment.

When using the force of the spring 13D during the operation of the tilt function, in other words, when tilting the seatback 5 to a position beyond the foremost position Pf (the position of the seat drawn in dashed-dotted lines in FIG. 7), the controller 14 stops the reclining electric motor 12E and activates the actuator 13E to place the engagement member 13B in the disengaged position. This enables the seatback 5 to be tilted to a position beyond the foremost position Pf by the force of the spring 13D.

Figure 7:
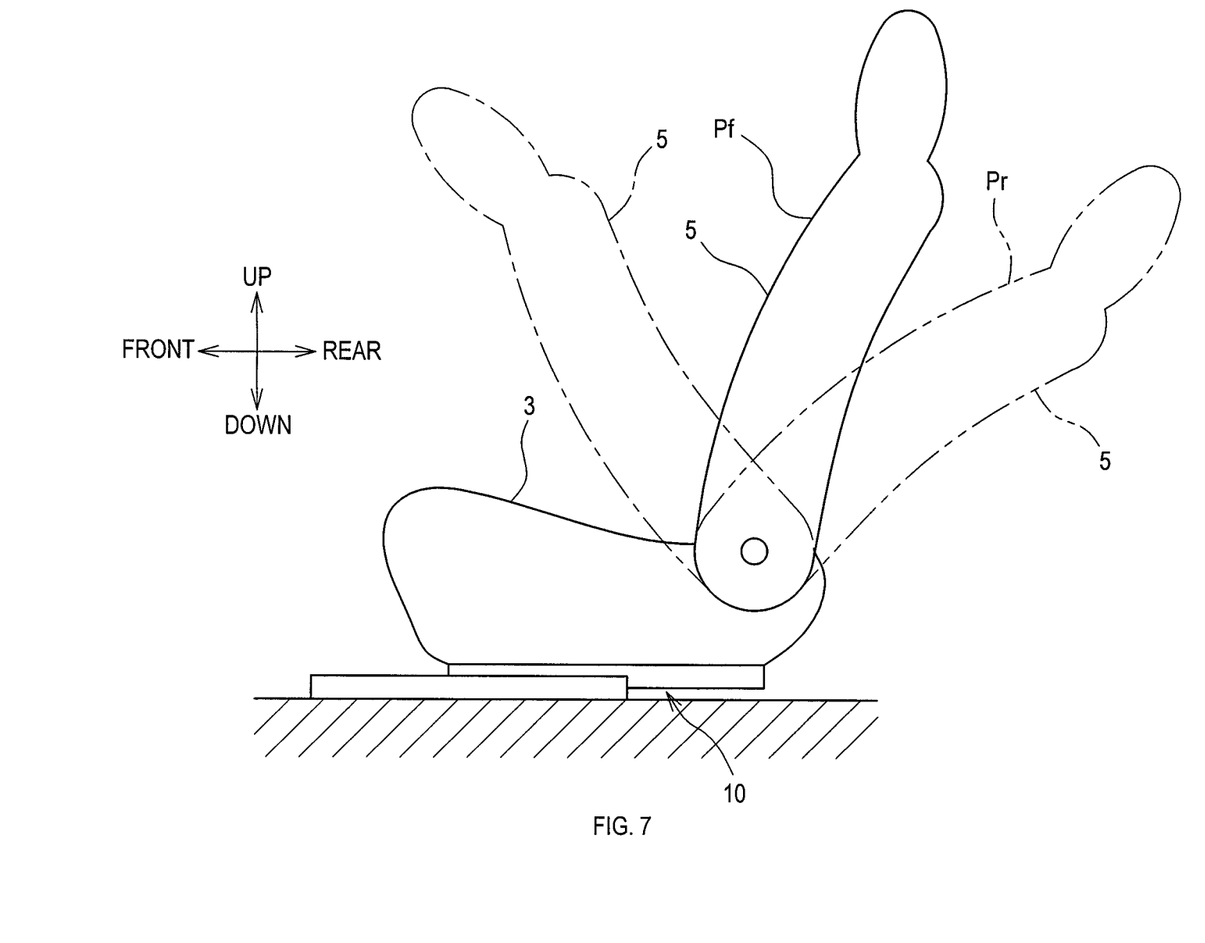
FIG. 7 is a diagram explaining operations of the vehicle seat device according to the first embodiment.

The controller 14 enables the tilt function in a case of tilting the seatback 5 towards the seat front side from a position where the seatback 5 is tilted to a seat rear side beyond a preset position (hereinafter referred to as rear-tilt position Pr) (the position of the seat drawn in dashed double-dotted lines in FIG. 7). Hereinafter, this operation is called a walk-in operation.

When the walk-in operation is initiated and then the tilt function is ended, the controller 14 activates the left and right sliding devices 10, in other words, activates the rail electric motor 10C, and slides the seat main body 2 towards the seat front side to a preset position.

In response to a conduction current value to the reclining electric motor 12E exceeding a preset threshold value after the initiation of the tilt function, the controller 14 according to the present embodiment determines that the seatback 5 has reached the foremost position Pf and accordingly interrupts electric conduction to the reclining electric motor 12E and activates the actuator 13E.

For this operation, the controller 14 is provided with an input of signals of a current meter 14A configured to detect the conduction current value to the reclining electric motor 12E. The controller 14 is additionally provided with an input of signals of a forward-tilting-angle detection sensor 14B and signals of a rearward-tilting-angle detection sensor 14C.

The forward-tilting-angle detection sensor 14B detects a forward-tilting angle of the seatback 5 to determine whether the tilt function is ended. The rearward-tilting-angle detection sensor 14C detects a rearward-tilting angle of the seatback 5 to detect whether the seatback 5 is tilted rearward beyond the rear-tilt position Pr.

The forward-tilting-angle detection sensor 14B according to the present embodiment includes a limit switch or a proximity switch that is configured to deliver an ON signal in response to the forward-tilting angle of the seatback 5 bringing the seatback 5 in the tilt state. The rearward-tilting-angle detection sensor 14C includes a limit switch or a proximity switch that is configured to deliver an ON signal in response to the rearward-tilting angle of the seatback 5 bringing the seatback 5 beyond the rear-tilt position Pr.

Figure 8:
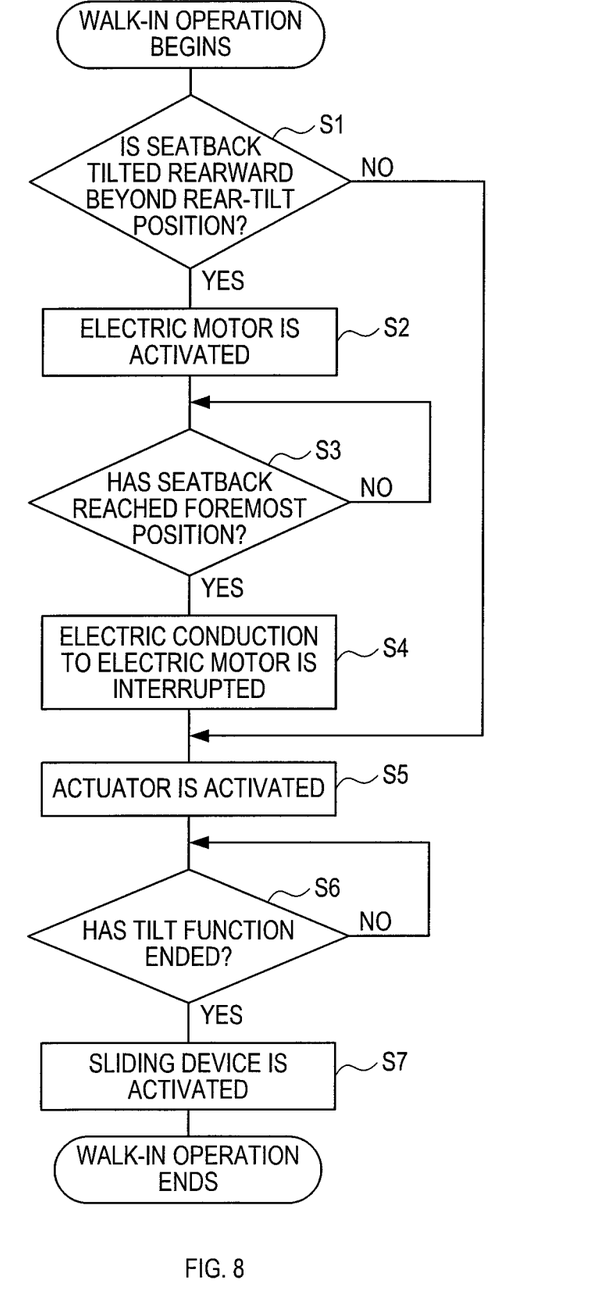
FIG. 8 is a flow chart showing operations of the vehicle seat device according to the first embodiment.

FIG. 8 is one example of a flowchart showing operations of the controller 14. Hereinafter, reference numerals in parentheses refer to reference numerals in FIG. 8.

In response to a manipulation on a walk-in switch 14D (see FIG. 2), the walk-in operation begins. The walk-in switch 14D is situated at an upper end portion (shoulder) of the seatback 5 or on the side surface of the seat cushion 3.

The controller 14 first determines whether the seatback 5 is tilted rearward beyond the rear-tilt position Pr (S1). If it is determined that the seatback 5 is not tilted rearward beyond the rear-tilt position Pr (S1:NO), then the controller 14 activates the actuator 13E to place the engagement member 13B in the disengaged position (S5). This causes the seatback 5 to be tilted forward beyond the foremost position Pf by the force of the spring 13D.

If it is determined that the seatback 5 is tilted rearward beyond the rear-tilt position Pr (S1:YES), then the controller 14 activates the reclining electric motor 12E (S2). This starts the rotational displacement of the seatback 5 towards the seat front side. The controller 14 then determines whether the seatback 5 has reached the foremost position Pf (S3).

If it is determined that the seatback 5 has not reached the foremost position Pf (S3:NO), then the controller 14 executes S3 again. If it is determined that the seatback 5 reaches the foremost position Pf (S3:YES), then the controller 14 interrupts the electric conduction to the reclining electric motor 12E (S4) and activates the actuator 13E (S5).

The controller 14 then determines whether the tilt function has ended (S6). If it is determined that the tilt function has not ended (S6:NO), then the controller 14 determines again whether the tilt function has ended (S6).

If it is determined that the tilt function has ended (S6:YES), then the controller 14 activates the sliding device 10, and therefore the rail electric motor 10C (S7). The controller 14 according to the present embodiment interrupts the electric conduction to the rail electric motor 10C in response to the conduction current to the rail electric motor 10C exceeding a rail current threshold value.

3. Characteristics of Vehicle Seat Device of Present Embodiment

The vehicle seat device 1 according to the present embodiment can enable the "folding down" through a hybrid method including the use of the reclining electric motor 12E and the spring 13D. Accordingly, the spring force of the spring 13D in the vehicle seat device 1 can be less than the spring force in the invention disclosed in Patent Document 1.

When the tilt function is active, the controller 14 rotationally displaces the seatback 5 towards the seat front side to the foremost position Pf by driving the reclining electric motor 12E and then rotationally displaces the seatback 5 to the tilt state by using the spring force of the spring 13D. This can reduce the necessary spring force.

The controller 14 stops the reclining electric motor 12E when using the spring force of the spring 13D while the tilt function is active. This enables the seatback 5 to return to a previous position before the tilt when the seatback 5 returns to the standing state from the tilt state.

If the reclining electric motor 12E is activated when the engagement member 13B is placed in the disengaged position, in other words, when the force of the spring 13D is acting on the seatback 5, then the seatback 5 returns to a position further forward than the previous position before the tilt when the seatback 5 returns to the standing state from the tilt state.

The controller 14 enables the activation of the tilt function when tilting the seatback 5 towards the seat front side from a state where the seatback 5 is tilted rearward towards the seat rear side beyond the rear-tilt position Pr. This can positively reduce the spring force.

OTHER EMBODIMENTS

In the aforementioned embodiment, the controller 14 rotationally displaces the seatback 5 towards the seat front side to the foremost position Pf by driving the reclining electric motor 12E and then rotationally displaces the seatback 5 to the tilt state by using the force of the spring 13D when the tilt function is active.

The present disclosure however should not be limited to the aforementioned embodiment. Alternatively, for example, the seatback 5 may be rotationally displaced to the tilt state by using the force of the spring 13D before reaching the foremost position Pf.

In the aforementioned embodiment, the electric motor 12E is stopped when using the force of the spring 13D during the operation of the tilt function. The present disclosure however should not be limited to the aforementioned embodiment. Alternatively, for example, the seatback 5 may be rotationally displaced to the tilt state by using the force of the spring 13D without stopping the reclining electric motor 12E.

In the aforementioned embodiment, the activation of the tilt function is enabled when tilting the seatback 5 towards the seat front side from a state where the seatback 5 is tilted rearward towards the seat rear side beyond the rear-tilt position Pr.

The present disclosure however should not be limited to the aforementioned embodiment. Alternatively, for example, the activation of the tilt function may be enabled when the seatback 5 is still placed forward of the rear-tilt position Pr.

The foremost position Pf according to the aforementioned embodiment is the foremost location of the seatback 5 on the seat front side within a possible range of the rotational displacement of the seatback 5 by the reclining electric motor 12E. The present disclosure however should not be limited to the aforementioned embodiment.

The controller 14 in the aforementioned embodiment determines that the seatback 5 has reached the foremost position Pf in response to the conduction current value to the reclining electric motor 12E exceeding the preset threshold value after the initiation of the tilt function. The present disclosure however should not be limited to the aforementioned embodiment. Alternatively, for example, the controller 14 may be configured to determine whether the seatback 5 has reached the foremost position Pf by detecting the angle of rotation of the seatback 5 by using a device such as an encoder and a potentiometer.

The forward-tilting-angle detection sensor 14B and the rearward-tilting-angle detection sensor 14C according to the aforementioned embodiment include the limit switch or the proximity switch. The present disclosure however should not be limited to the aforementioned embodiment. Alternatively, for example, the angle of rotation of the seatback 5 may be detected by using a device such as an encoder and a potentiometer.

The reclining mechanism 12 and the folding down mechanism 13 according to the present disclosure should not be limited to the configurations according to the aforementioned embodiment. The present disclosure is not limited to the aforementioned embodiments as long as it falls within the spirit of the disclosure described in the aforementioned embodiments.

Accordingly, the present disclosure may be configured in combination of at least two of the aforementioned embodiments or may be the aforementioned embodiments configured without either the elements described in the drawings or the elements described with reference numerals.

What is claimed is:

1. A vehicle seat device configured to be mounted to a vehicle comprising:
   a seat main body comprising a seat cushion and a seatback rotatable about a lower end of the seatback; and
   a tilt device comprising an electric motor and a spring, the electric motor being configured to exert a rotational force to rotationally displace the seatback, and the spring being configured to exert a resilient force to rotationally displace the seatback towards a seat front side;
   wherein the tilt device is configured to exert a tilt function to tilt the seatback towards the seat front side by using the electric motor and the spring,
   wherein, when the tilt function is active, the tilt device rotationally displaces the seatback towards the seat front side to a given first position by driving the electric motor and then rotationally displaces the seatback towards the seat front side beyond the first position to a tilt state by using a force of the spring, and
   wherein the given first position is a foremost location of the seatback in the seat front side within a possible range of the rotational displacement of the seatback by the electric motor.

2. The vehicle seat device according to claim 1, wherein the tilt device stops the electric motor when using a force of the spring while the tilt function is active.

3. The vehicle seat device according to claim 1, wherein the tilt function is configured to be active when tilting the seatback towards the seat front side from a state where the seatback is tilted rearward towards a seat rear side beyond a given second position.

4. The tilt device according to claim 1, further comprising:
a tilting member arranged on an approximately same axis as a rotation center axis of the seatback, wherein the tilting member is configured to transmit the rotational force of the electric motor to the seatback and is rotatable relative to the seatback;
an engagement member coupled to the seatback and displaceable between an engaged position for an engagement with the tilting member and a disengaged position where the engagement is released, wherein the engagement member is configured to enable transmission of the rotational force to the seatback when placed in the engaged position;
a locking member configured to be displaceable between a locking position for retaining the engagement member in the engaged position and an unlocking position displaced from the locking position; an electric actuator configured to displace the locking member; and
a controller configured to control an operation of the electric motor and the electric actuator.

5. The vehicle seat device according to claim 4, wherein the locking member is configured to be rotationally displaceable between the locking position and the unlocking position, and wherein the electric actuator is configured to rotationally displace the locking member via a manipulation cable.

6. The vehicle seat device according to claim 4, wherein a force of the spring is transmittable to the seatback in response to an upward displacement of the engagement member relative to the tilting member.

7. The vehicle seat device according to claim 1 further comprising:
a sliding device configured to slide a seat main body,
wherein the sliding device is configured to slide the seat main body towards the seat front side in response to an end of the tilt function.

8. The vehicle seat device according to claim 1, wherein the tilt device comprises a first reclining mechanism on a first end and a second reclining mechanism on a second end across a seat-width axis, wherein the first and the second reclining mechanisms are located at a rotation center of the seatback; and a drive shaft arranged in the rotation center of the seatback, wherein the drive shaft extends along the seat-width axis and is configured to transmit a driving force to the first and the second reclining mechanisms, and wherein the electric motor is configured to provide the rotational force to the drive shaft.

9. A vehicle seat device configured to be mounted to a vehicle comprising:
a seat main body comprising a seat cushion and a seatback rotatable about a lower end of the seatback; and
a tilt device comprising an electric motor and a spring, the electric motor being configured to exert a rotational force to rotationally displace the seatback, and the spring being configured to exert a resilient force to rotationally displace the seatback towards a seat front side;
wherein the tilt device is configured to exert a tilt function to tilt the seatback towards the seat front side by using the electric motor and the spring,
wherein, when the tilt function is active, the electric motor is driven to rotationally displace the seatback towards the seat front side to a given first position and the spring is urged to rotationally displace the seatback towards the seat front side beyond the first position to a tilt state, and
wherein the given first position is a foremost location of the seatback in the seat front side within a possible range of the rotational displacement of the seatback by the electric motor.

10. A vehicle seat device configured to be mounted to a vehicle comprising:
a seat main body comprising a seat cushion and a seatback rotatable about a lower end of the seatback; and
a tilt device comprising an electric motor and a spring, the electric motor being configured to exert a rotational force to rotationally displace the seatback, and the spring being configured to exert a resilient force to rotationally displace the seatback towards a seat front side,
wherein the tilt device is configured to exert a tilt function to tilt the seatback towards the seat front side by using the electric motor and the spring, and
wherein a possible range of the rotational displacement of the seatback using the force of the spring by the tilt device extends more towards the seat front side than a possible range of the rotational displacement of the seatback caused by driving the electric motor by the tilt device.

* * * * *